United States Patent
Chaney et al.

(10) Patent No.: US 7,874,137 B2
(45) Date of Patent: Jan. 25, 2011

(54) GAS TURBINE ENGINE ANTI-ICE FORMATION DEVICE AND SYSTEM

(75) Inventors: Tina H. Chaney, Phoenix, AZ (US); Dave G. Dischinger, Tempe, AZ (US); Alan G. Tiltman, Fountain Hills, AZ (US); Dwight D. Vettel, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 1084 days.

(21) Appl. No.: 11/764,581

(22) Filed: Jun. 18, 2007

(65) Prior Publication Data
US 2008/0307769 A1 Dec. 18, 2008

(51) Int. Cl.
*F02G 3/00* (2006.01)
(52) U.S. Cl. .................. 60/39.093; 244/134 R
(58) Field of Classification Search ............. 60/39.093; 244/134 R, 134 B, 53 B
See application file for complete search history.

(56) References Cited

U.S. PATENT DOCUMENTS

| | | | | |
|---|---|---|---|---|
| 2,654,992 A | * | 10/1953 | Marchant et al. | 60/39.093 |
| 2,747,365 A | * | 5/1956 | Rainbow | 60/39.093 |
| 3,057,154 A | | 10/1962 | Sherlaw et al. | |
| 3,123,283 A | * | 3/1964 | Leis | 415/115 |
| 3,163,003 A | | 12/1964 | Paul et al. | |
| 3,230,710 A | | 1/1966 | Van Nimwegen et al. | |
| 3,368,616 A | * | 2/1968 | Adams et al. | 165/164 |
| 3,981,466 A | * | 9/1976 | Shah | 244/134 R |
| 4,240,250 A | * | 12/1980 | Harris | 60/39.093 |
| 4,406,431 A | * | 9/1983 | Heuberger | 244/53 B |
| 4,688,745 A | | 8/1987 | Rosenthal | |
| 4,852,343 A | | 8/1989 | Norris et al. | |
| 4,860,534 A | * | 8/1989 | Easley et al. | 60/39.092 |
| 5,088,277 A | | 2/1992 | Schulze | |
| 5,623,821 A | * | 4/1997 | Bouiller et al. | 60/39.093 |
| 5,873,544 A | * | 2/1999 | Pike et al. | 244/1 A |
| 6,241,189 B1 | | 6/2001 | Porte | |
| 6,267,328 B1 | | 7/2001 | Vest | |
| 6,354,538 B1 | | 3/2002 | Chilukuri | |
| 6,442,944 B1 | | 9/2002 | Skur, III | |
| 6,593,547 B1 | * | 7/2003 | Raad | 219/201 |
| 6,688,558 B2 | * | 2/2004 | Olsen et al. | 244/134 R |
| 6,698,691 B2 | * | 3/2004 | Porte | 244/134 B |
| 2002/0148929 A1 | | 10/2002 | Andre et al. | |

(Continued)

OTHER PUBLICATIONS

Drawings for 4-161-040-12 (6 sheets).

*Primary Examiner*—Michael Cuff
*Assistant Examiner*—Phutthiwat Wongwian
(74) *Attorney, Agent, or Firm*—Ingrassia Fisher & Lorenz, P.C.

(57) ABSTRACT

An anti-ice formation device for a gas turbine engine is configured to be mounted within an inlet duct of the engine, and adjacent the gas turbine engine compressor inlet. The device is configured to selectively receive a flow of compressed air that is discharged from the compressor. Because the compressed air is relatively hot, the anti-ice formation device temperature increases to a temperature sufficient to prevent ice accumulation and formation in the engine inlet duct. The anti-ice formation device is also configured such that heat is not transferred to the compressor inlet housing. As a result, the anti-ice formation device does not cause impeller clearance variations, which would adversely affect engine performance.

20 Claims, 4 Drawing Sheets

U.S. PATENT DOCUMENTS

2005/0023412 A1  2/2005  Baptist et al.
2005/0035110 A1  2/2005  Petrenko
2005/0109011 A1  5/2005  Courtot et al.
2005/0150204 A1  7/2005  Stretton et al.
2006/0037303 A1  2/2006  Thompson

* cited by examiner

GAS TURBINE ENGINE ANTI-ICE FORMATION DEVICE AND SYSTEM

TECHNICAL FIELD

The present invention generally relates to ant-ice systems and, more particularly, to an anti-ice formation device and system for gas turbine engines that maintains sufficient axial clearances.

BACKGROUND

Gas turbine engines are used in myriad systems and environments. For example, gas turbine engines are used in various types of aircraft and watercraft, and in numerous industrial systems and environments. In each of these exemplary systems and environments, gas turbine engines may be used to supply propulsion power, to generate electrical power, or both. No matter its specific end-use, a gas turbine engine typically includes a combustor, a power turbine, and a compressor. During operation, the compressor draws in ambient air, compresses it, and supplies compressed air to the combustor. The combustor receives fuel from a fuel source and the compressed air from the compressor, and supplies high energy combustion gas to the power turbine, causing it to rotate. The power turbine includes a shaft that may be used to drive the compressor. Moreover, depending upon the particular end-use, the turbine may additionally drive a generator, a turbo fan, or a shaft that drives a power source.

In addition to its potentially myriad uses, a gas turbine engine may also be exposed to numerous and varied environmental conditions. For example, a gas turbine engine may be exposed to relatively high altitudes, adverse weather conditions, or numerous other conditions that may result in operation below freezing temperatures. During operations below freezing, ice formation may occur at various locations on or within the gas turbine engine. The gas turbine engine inlet is particularly prone to ice formation during such freezing conditions. Not surprisingly, excessive ice formation and accumulation, or the ingestion of ice into the inlet, can adversely affect gas turbine engine performance and/or have various other deleterious effects on gas turbine engine components.

In particular, it is generally known that the operating efficiency of a gas turbine is at least partially dependent upon the axial clearance or gap between rotor blade tips and the shroud. If the axial clearance between the rotor blade tips and the surrounding shroud is too large, additional flow may leak through the gap between the rotor blade tips and the surrounding shroud, decreasing the turbine's efficiency. Conversely, if the axial clearance is too small, the rotor blade tips may strike the surrounding shroud during certain turbine operating conditions. It is also generally known that axial clearances may change due, among other factors, to relative thermal growth between the rotating rotor and stationary shroud. During periods of such differential thermal growth, clearance between the moving blade tips and the stationary shroud may occur. Since components of turbines and other rotating machines are, in many instances, made of different materials with different thicknesses, such components exhibit different rates of thermal growth from a cold startup condition to steady state operating condition and during transient operating conditions.

To facilitate optimizing turbine efficiency, various clearance management tools and/or design methodologies may be used to attain a balanced design that provides relatively tight operating clearances, yet avoids potential rubbing during transients and/or during operations at off-design conditions and/or that may result from differential thermal growth. Various anti-ice formation devices presently known do not provide adequate thermal isolation to differential thermal growth.

Hence, there is a need for a device and system that prevents, or at least substantially prevents, ice formation and accumulation on a gas turbine engine inlet and/or ice ingestion into a gas turbine engine inlet, and that does not adversely impact axial clearances within the engine. The present invention addresses at least this need.

BRIEF SUMMARY

In one embodiment, and by way of example only, an anti-ice formation device that is for a gas turbine engine that includes at least a compressor inlet, comprises a flow body, a mount structure, and a plurality of spaced-apart supports. The flow body is configured to surround at least a portion of the compressor inlet and includes an inner surface, an outer surface, and an inlet port. The inner surface defines a flow cavity, and the inlet port extends between the flow body inner and outer surfaces and is adapted to receive a flow of fluid. The mount structure is spaced apart from the flow body and is adapted to be disposed within, and coupled to, the compressor inlet. The mount structure includes at least one discharge flow passage. The plurality of spaced-apart supports are coupled to the flow body and the mount structure. At least one of the supports includes a flow passage that is in fluid communication with the flow body cavity and the at least one mount structure discharge flow passage.

In another exemplary embodiment, an anti-ice system for gas turbine engine that includes at least a compressor having a compressor inlet, comprises an anti-ice control valve and an anti-ice formation device. The anti-ice control valve includes a valve inlet and a valve outlet. The valve inlet is adapted to receive a flow of compressed air discharged from a gas turbine engine compressor. The anti-ice control valve is movable between a closed position, in which the valve inlet is not in fluid communication with the valve outlet, and an open position, in which the valve inlet is in fluid communication with the valve outlet. The anti-ice formation is device coupled to the anti-ice control valve and is configured to mount adjacent the compressor inlet. The anti-ice formation device includes a flow body, a mount structure, and a plurality of spaced-apart supports. The flow body is configured to surround at least a portion of the compressor inlet and includes an inner surface, an outer surface, and an inlet port. The inner surface defines a flow cavity, and the inlet port extends between the flow body inner and outer surfaces and is in fluid communication with the valve outlet. The mount structure is spaced apart from the flow body and is adapted to be disposed within, and to be coupled to, the compressor inlet. The mount structure includes at least one discharge flow passage. The plurality of spaced-apart supports are coupled to the flow body and the mount structure. At least one the spaced-apart supports includes a flow passage that is in fluid communication with the flow body cavity and the at least one mount structure discharge flow passage.

In yet another exemplary embodiment, a gas turbine engine includes a housing, a compressor, a combustor, a turbine, and an anti-ice formation device. The housing has an inlet duct. The compressor, combustor, and turbine are all mounted in flow series within the housing. The compressor has an inlet in fluid communication with the housing inlet duct. The anti-ice formation device is mounted within the housing inlet duct and adjacent the compressor inlet. The anti-ice formation device comprises a flow body, a mount structure, and a plurality of spaced-apart supports. The flow body is configured to surround at least a portion of the compressor inlet and includes an inner surface, an outer surface, and an inlet port. The inner surface defines a flow cavity. The inlet port is coupled to at least selectively receive a flow of compressed air discharged from the compressor. The mount structure is spaced apart from the flow body, is disposed within, and coupled to, the compressor inlet housing, and includes at least one discharge flow passage. The plurality of spaced-apart supports are coupled to the flow body and the mount structure. At least one of the spaced-apart supports includes a flow passage that is in fluid communication with the flow body cavity and the at least one mount structure discharge flow passage.

Other desirable features and characteristics of the anti-ice formation device and system will become apparent from the subsequent detailed description and the appended claims, taken in conjunction with the accompanying drawings.

BRIEF DESCRIPTION OF THE DRAWINGS

The present invention will hereinafter be described in conjunction with the following drawing figures, wherein like numerals denote like elements, and wherein.

DETAILED DESCRIPTION OF PREFERRED EMBODIMENTS

The following detailed description is merely exemplary in nature and is not intended to limit the invention or the application and uses of the invention. Furthermore, there is no intention to be bound by any theory presented in the preceding background or the following detailed description.

Figure 1:
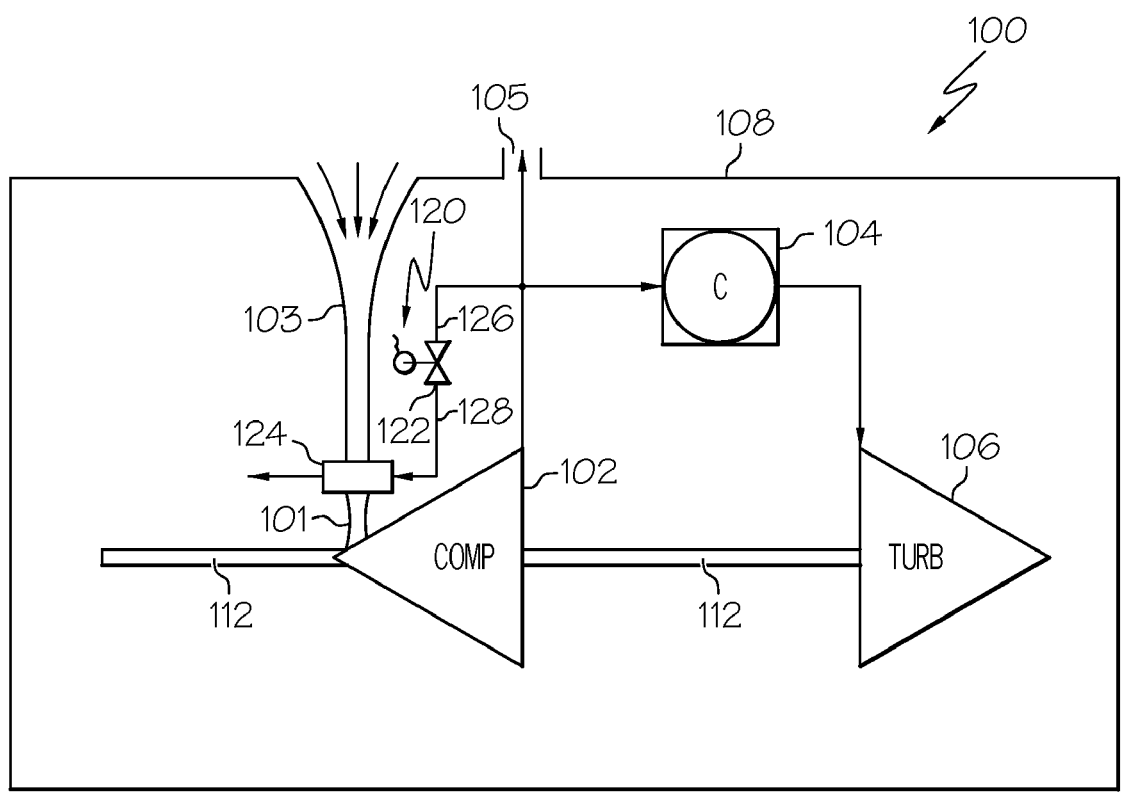
FIG. 1 is a simplified schematic diagram of an exemplary gas turbine engine.
Figure 2:
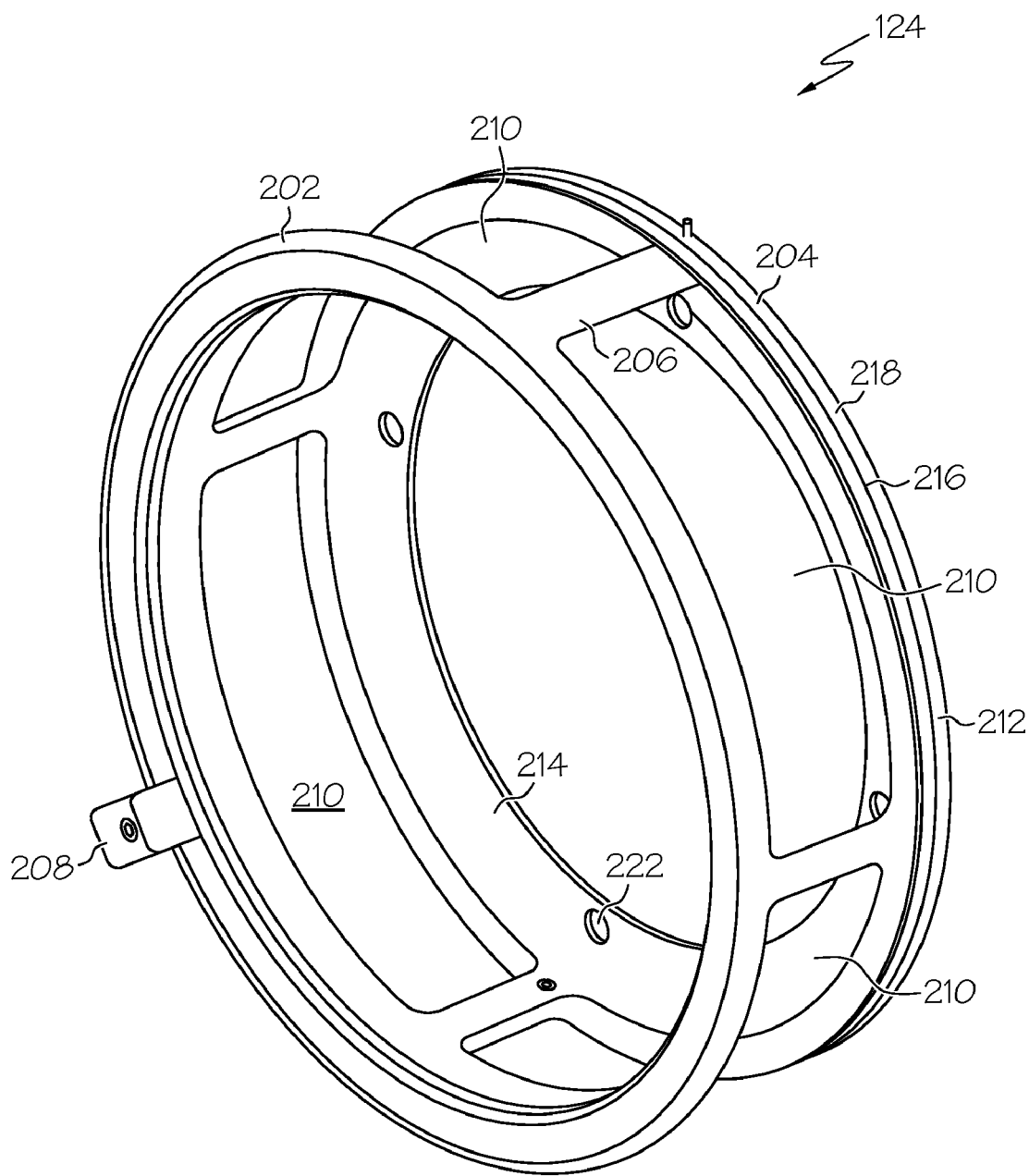
FIG. 2 is a plan view of an exemplary anti-ice formation device that may be mounted within the gas turbine engine of FIG. 1.
Figure 3:
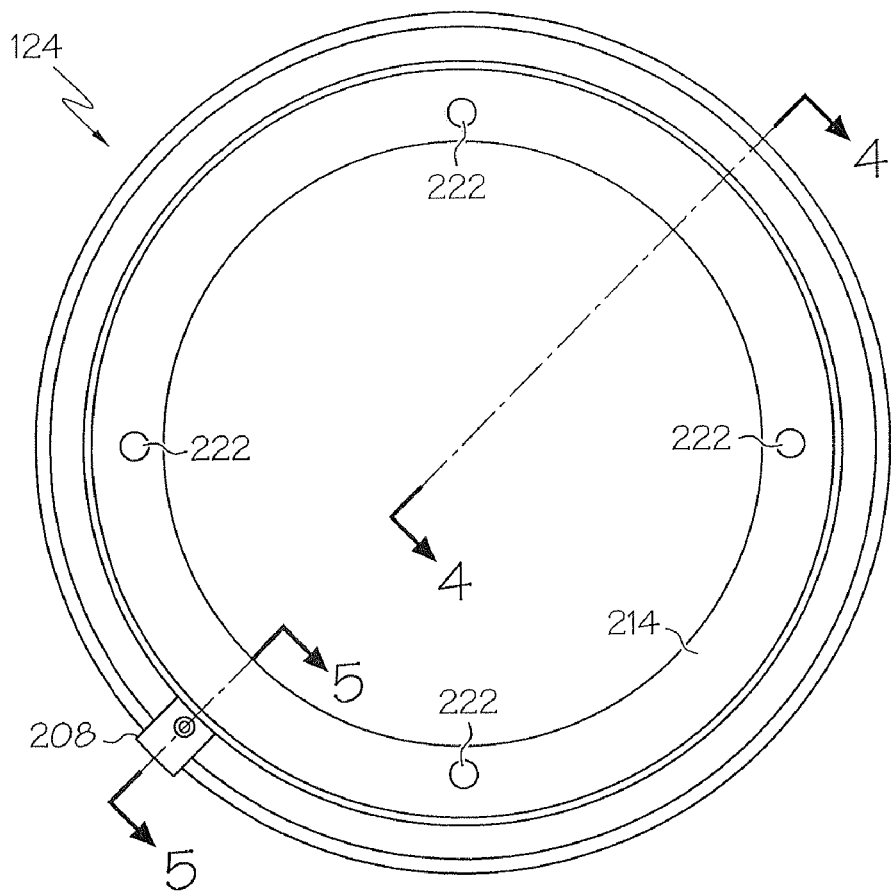
FIG. 3 is a front view of the exemplary anti-ice formation device depicted in FIG. 2.
Figure 4:
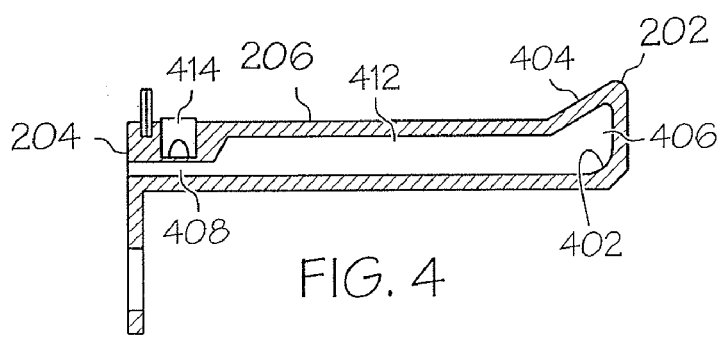
FIG. 4 is a cross section view of the exemplary anti-ice formation device taken along line 4-4 in FIG. 3.
Figure 5:
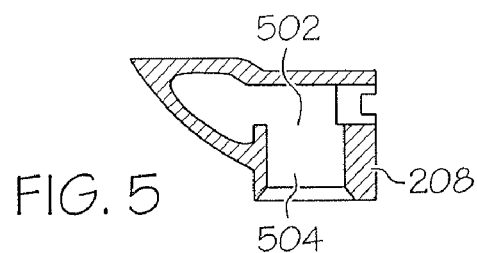
FIG. 5 is a cross section view of a portion of the exemplary anti-ice formation device taken along line 5-5 in FIG. 3.

Turning now to FIG. 1, an embodiment of an exemplary gas turbine engine 100 is shown in simplified schematic form. The gas turbine engine 100 includes a compressor 102, a combustor 104, and a turbine 106, all preferably housed within an engine housing 108. During operation of the gas turbine engine 100, the compressor 102 draws ambient air into a compressor inlet 101, via a housing inlet duct 103 formed in the engine housing 108. The compressor 102 compresses the ambient air, and supplies a portion of the compressed air to the combustor 104, and may also supply compressed air to a bleed air port 105. The bleed air port 105, if included, may be used to supply compressed air to, for example, a non-illustrated environmental control system or other load. It will be appreciated that the compressor 102 may be any one of numerous types of compressors now known or developed in the future. For example, the compressor may be a single-stage or a multi-stage centrifugal compressor.

The combustor 104 receives the compressed air from the compressor 102, and also receives a flow of fuel from a non-illustrated fuel source. The fuel and compressed air are mixed within the combustor 104, and are ignited to produce relatively high-energy combustion gas. The combustor 104 may be implemented as any one of numerous types of combustors now known or developed in the future. Non-limiting examples of presently known combustors include various can-type combustors, various reverse-flow combustors, various through-flow combustors, and various slinger combustors.

No matter the particular type of combustor 104 that is used, the relatively high-energy combustion gas that is generated in the combustor 104 is supplied to the turbine 106. As the high-energy combustion gas expands through the turbine 106, it impinges on the turbine blades (not shown in FIG. 1), which causes the turbine 106 to rotate. It will be appreciated that the turbine 106 may be implemented using any one of numerous types of turbines now known or developed in the future including, for example, a vaned radial turbine, a vaneless radial turbine, and a vaned axial turbine. No matter the particular type of turbine that is used, the turbine 106 includes an output shaft 112 that drives the compressor 102. Moreover, depending on the particular end-use of the gas turbine engine 100, the turbine 106, via the output shaft 112, may also drive a non-illustrated generator, a non-illustrated propeller, and/or one or more numerous other non-illustrated components.

The gas turbine engine 100 may be exposed to relatively high altitudes, adverse weather conditions, or various other conditions that may result in operation in environments below freezing temperatures. Thus, the gas turbine engine 100 also preferably includes an anti-ice formation system 120 to prevent excessive ice formation and accumulation on, and thus ice ingestion into, the compressor inlet 101 and the housing inlet duct 103. The anti-ice formation system 120 includes an anti-ice control valve 122 and an anti-ice formation device 124. The anti-ice control valve 122 includes a valve inlet 126 and a valve outlet 128. The valve inlet 126 is coupled to receive a portion of the compressed air discharged from the compressor 102, and the valve outlet 128 is coupled to the anti-ice formation device 124.

The anti-ice control valve 122 is movable between a closed position and an open position. In the depicted embodiment, the anti-ice control valve 122 responds to valve position command signals supplied thereto from a remote source. It will be appreciated that the remote source may be responsive to user input to supply the appropriate valve command signals, or may be responsive to one or more sensor inputs to automatically supply the appropriate valve commands. In either case, when the valve 122 is in the closed position, the valve inlet 126 is not in fluid communication with the valve outlet 128, and thus compressed air is not supplied to the ant-ice formation device 124. Conversely, when the valve 122 is in an open position, the valve inlet 126 is in fluid communication with the valve outlet 128, and a portion of the compressed air discharged from the compressor 102 is supplied to the anti-ice formation device 124. It will additionally be appreciated that the valve 122 is not included in some embodiments.

The anti-ice formation device 124 is mounted within the housing inlet duct 103 and adjacent the compressor inlet 101 and, when the anti-ice control valve 122 is in the open position, receives a flow of compressed air that is discharged from the compressor 102. As will be described in more detail below, the compressed air flows in and through the anti-ice formation device 124, and is discharged into the engine housing 108. As may be appreciated, the compressed air discharged from the compressor 102 is at a relatively high temperature, thus heating the anti-ice formation device 124 to a temperature that prevents ice formation and accumulation in the compressor inlet 101 and housing inlet duct 103. A preferred embodiment of the anti-ice formation device 124 is depicted in FIGS. 2-5, and with reference thereto will now be described in more detail.

The anti-ice formation device 124 includes a flow body 202, a mount structure 204, and a plurality of spaced-apart supports 206. The flow body 202, which is preferably substantially ring-shaped, is configured to surround at least a portion of the compressor inlet 101 and, as shown most clearly in FIG. 4, includes an inner surface 402 and an outer surface 404. The inner surface defines a cavity 406, through which compressed air may flow. As shown most clearly in FIG. 5, the flow body 202 additionally includes an inlet port 502 that extends between the flow body inner 402 and outer 404 surfaces. The inlet port 502, when disposed within the gas turbine engine 100, is coupled to at least selectively receive a flow of compressed air discharged from the compressor 102 via, for example, the anti-ice control valve 122.

In the depicted embodiment, the anti-ice formation device 124 also includes an inlet boss 208 that extends from the flow body outer surface 404. The inlet boss 208 includes an inlet passage 504, which is shown most clearly in FIG. 5, that is in fluid communication with the flow body inlet port 502. Preferably, a non-illustrated conduit extends between the inlet boss 208 and the anti-ice control valve 122 (if included), and provides fluid communication between the anti-ice formation device 124 and the anti-ice control valve 122.

Returning again to FIG. 2, the mount structure 204, which is also preferably substantially ring-shaped, is spaced apart from the flow body 202, but is coupled to the flow body 202 via the spaced-apart supports 206. Thus, a flow area 210 is defined between the flow body 202, the mount structure 204, and between each of the supports 206. With quick reference once again to FIG. 4, it is seen that the mount structure 204 includes at least one discharge passage 408, and that at least one of the supports 206 has a flow passage 412 formed therein that provides fluid communication between the flow body cavity 406 and the discharge flow port 408. In the preferred embodiment, a flow passage 412 is formed in each of the supports 206, and the mount structure 204 includes a discharge flow passage 408 associated with each of the flow passages 412. No matter the particular number of discharge flow passages 408 and support flow passages 412, it will be appreciated that when compressed air is supplied to the flow body cavity 406, the compressed air will circulate around the cavity 406, flow through the support flow passages 412, and be discharged from the discharge flow passages 408.

As will be described in more detail further below, the mount structure 204 is preferably coupled to the compressor inlet 101 via a plurality of fasteners. Thus, in the depicted embodiment, the mount structure 204 includes a main body 212 and a mount flange 214. The main body 212 is coupled to each of the plurality of supports 206, and each of the discharge flow passages 408 is formed therein. As FIG. 2 additionally shows, a seal groove 216 is preferably formed in an outer peripheral surface 218 of the main body 212. A seal 414, which is shown most clearly in FIG. 4, may be disposed within the seal groove 216 to seal the inlet plenum. The mount flange 214 extends radially inwardly from the main body 212, and a plurality of fastener openings 222 extend axially through the mount flange 214. The plurality of fasteners that are used to couple the mount structure 204 to the compressor inlet 101 extend, one each, through each of the fastener openings 222. Moreover, and as will now be described, the anti-ice formation device 124 is configured such that when it is mounted within the gas turbine engine 100, via the plurality of fasteners, there is a small radial air gap between the structure that defines the compressor inlet 101 and at least portions of the anti-ice formation device 124. Before doing so, however, it is noted that although the depicted anti-ice formation device 124 is mounted via the mount structure 204, it will be appreciated that the device 124 could alternatively be mounted via the flow body 202.

Figure 6:
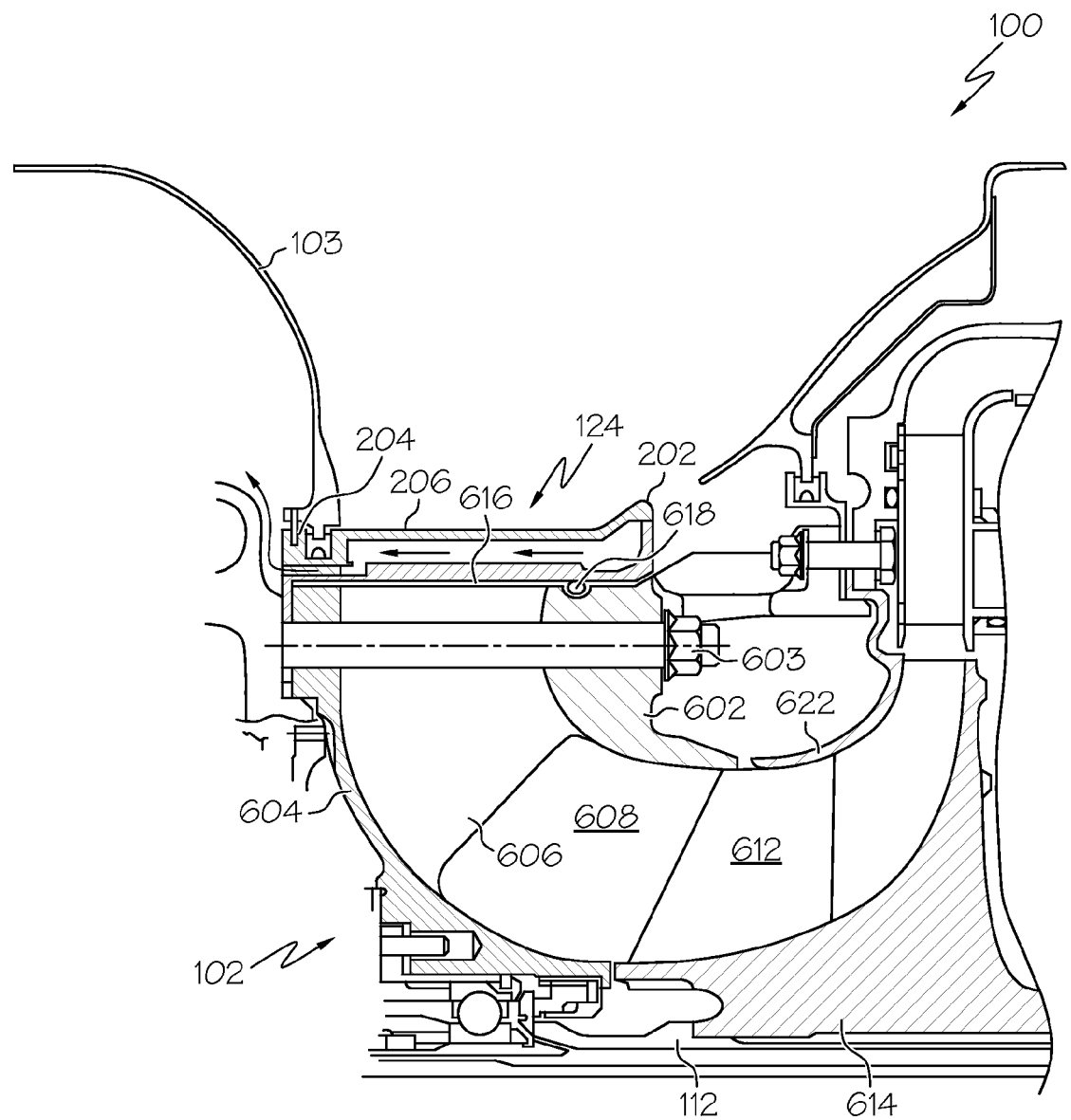
FIG. 6 is a partial cross section view of a portion of a physical implementation of the gas turbine engine of FIG. 1 with the exemplary anti-ice formation device of FIGS. 2-5 mounted therein.

Turning now to FIG. 6, a partial cross section view of a portion of a physical implementation of the gas turbine engine 100 with the anti-ice formation device 124 mounted therein is depicted and will now be briefly described. The portion of the gas turbine engine 100 that is depicted in FIG. 6 is a portion of the compressor 102, and the compressor inlet 101. The compressor inlet 101 is defined by an aft annular housing 602 and a forward annular housing 604 that are spaced apart from each other and interconnected by a plurality of axially disposed struts 606 to form an annular inlet flow path 608 to the compressor 102. The compressor 102, at least in the depicted embodiment, is a two-stage centrifugal compressor (only one stage depicted in FIG. 6) that includes a centrifugal impeller 612 and a hub 614. The impeller 612 is coupled to the hub 614, which is in turn coupled to the above-mentioned output shaft 112.

The anti-ice formation device 124 is mounted within the housing inlet duct 103 and adjacent the compressor inlet 101. More specifically, the anti-ice formation device flow body 202 surrounds at least a portion of the compressor inlet aft housing 604, and the mount structure 204 is coupled to, and surrounds at least a portion of, the compressor inlet forward housing 604. As previously mentioned, the anti-ice formation device 124 is coupled to the compressor inlet 101 via a plurality of fasteners 603 that extend, one each, through each of the compressor inlet struts 608 and each of the fastener openings 222 that are formed in the mount flange 214. Moreover, each of the anti-ice formation device supports 206 (only one depicted in FIG. 6) extends across, and is at least substantially axially aligned with, one of the compressor inlet struts 608.

As FIG. 6 additionally depicts, in a somewhat exaggerated form for clarity, the anti-ice formation device 124 is preferably configured such that, when it is mounted within the housing inlet duct 103, it is at least partially spaced-apart from the compressor inlet 101. Thus, a small air gap 616 is preferably defined between the anti-ice formation device 124 and at least portions of the compressor inlet 101. The air gap 616 provides thermal insulation between the anti-ice formation device 124 and the compressor inlet 101. As a result, when relatively hot compressed air is supplied to the anti-ice formation device 124, the compressor inlet 101 temperature is not substantially impacted. Minimizing compressor inlet 101 temperature variations minimizes any impact that such temperature variations may have on clearances between the compressor impeller 612 and the compressor shroud 622. In turn, any impact such temperature variations may have on engine performance is minimized. It will be appreciated that the size of the air gap 616 may vary depending, for example, on the size and type of engine being used, but in one particular embodiment an air gap size of about 0.015-inch was sufficient.

In addition to being configured with the air gap 616, it will be appreciated that one or more seals may be disposed between the anti-ice formation device 124 and the compressor inlet 101. In the depicted embodiment, it is seen that a seal 618 is disposed between the anti-ice formation device flow body 202 and the aft annular housing 602. The seals 618, if included, provides vibration damping between the anti-ice formation device 124 and the compressor inlet 101. It will be appreciate that the configuration of the seals 618, 622 may vary, but are preferably configured as O-ring seals.

With continued reference to FIG. 6, it may be seen that when compressed air, which is represented via the flow arrows, is supplied to flow body 202, the compressed air flows around the cavity 406, and into each of the flow passages 412 in the supports 206. The compressed air then flows through the associated discharge flow passages 408 formed in the mount structure 204, and is discharged into a cavity 624 in the engine housing 108. Thus, the relatively hot compressed air is not ingested into the compressor 102, or any other portion of the engine flow path.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An anti-ice formation device for a gas turbine engine that includes a centrifugal compressor having a compressor inlet across which is disposed a plurality of struts, the device comprising:
   a flow body configured to surround at least a portion of the compressor inlet and including an inner surface, an outer surface, and an inlet port, the inner surface defining a flow cavity, the inlet port extending between the flow body inner and outer surfaces and adapted to receive a flow of fluid;
   a mount structure spaced apart from the flow body and adapted to surround at least a portion of, and to be coupled to, the compressor inlet, the mount structure including at least one discharge flow passage formed therein; and
   a plurality of spaced-apart supports coupled to the flow body and the mount structure, each of the spaced-apart supports configured to extend across and align with one of the plurality of struts at least one of the supports including a flow passage formed therein that is in fluid communication with the flow body cavity and the at least one mount structure discharge flow passage.

2. The device of claim 1, further comprising:
   an inlet boss extending from the flow body outer surface, the inlet boss having an inlet passage in fluid communication with the flow body inlet port.

3. The device of claim 1, wherein:
   the mount structure includes a plurality of discharge flow passages formed therein; and
   each of the supports includes a flow passage formed therein that is in fluid communication with the flow body cavity and one of the plurality of mount structure discharge flow passages.

4. The device of claim 1, wherein the mount structure comprises:
   a main body coupled to each of the plurality of supports and including the at least one discharge flow passage; and
   a mount flange extending radially inwardly from the main body and including a plurality of fastener openings extending axially therethrough.

5. The device of claim 4, wherein the mount structure main body further includes an outer peripheral surface having a seal groove formed therein, and wherein the device further comprises:
   a seal disposed within the seal groove.

6. An anti-ice system for gas turbine engine that includes at least a centrifugal compressor having a compressor inlet, the system comprising:
   an anti-ice control valve including a valve inlet and a valve outlet, the valve inlet adapted to receive a flow of compressed air discharged from the gas turbine engine compressor, the anti-ice control valve movable between a closed position, in which the valve inlet is not in fluid communication with the valve outlet, and an open position, in which the valve inlet is in fluid communication with the valve outlet; and
   an anti-ice formation device coupled to the anti-ice control valve and configured to mount adjacent the compressor inlet, the anti-ice formation device comprising:
   a flow body configured to surround at least a portion of the compressor inlet and including an inner surface, an outer surface, and an inlet port, the inner surface defining a flow cavity, the inlet port extending between the flow body inner and outer surfaces and in fluid communication with the valve outlet,
   a mount structure spaced apart from the flow body and adapted to be disposed within, and coupled to, the compressor inlet, the mount structure having at least one discharge flow passage formed therein, and
   a plurality of spaced-apart supports coupled to the flow body and the mount structure, at least one the spaced-apart supports having a flow passage formed therein that is in fluid communication with the flow body cavity and the at least one mount structure discharge flow passage.

7. The system of claim 6, further comprising:
   an inlet boss extending from the flow body outer surface, the inlet boss having an inlet passage in fluid communication with the flow body inlet port and the valve outlet.

8. The system of claim 6, wherein:
   the mount structure includes a plurality of discharge flow passages formed therein; and
   each of the supports includes a flow passage formed therein that is in fluid communication with the flow body cavity and one of the plurality of mount structure discharge flow passages.

9. The system of claim 6, wherein the mount structure comprises:
   a main body coupled to each of the plurality of supports and including the at least one discharge flow passage; and
   a mount flange extending radially inwardly from the main body and including a plurality of fastener openings extending axially therethrough.

10. The system of claim 9, wherein:
    the mount structure main body further includes an outer peripheral surface having a seal groove formed therein; and
    the anti-ice formation device further comprises a seal disposed within the seal groove.

11. A gas turbine engine, comprising:
    a housing having an inlet duct; a centrifugal compressor, a combustor, and a turbine all mounted in flow series within the housing, the compressor having an inlet in fluid communication with the housing inlet duct; and
    an anti-ice formation device mounted within the housing inlet duct and adjacent the compressor inlet, the anti-ice formation device comprising:

a flow body configured to surround at least a portion of the compressor inlet and including an inner surface, an outer surface, and an inlet port, the inner surface defining a flow cavity, the inlet port coupled to at least selectively receive a flow of compressed air discharged from the compressor, a mount structure spaced apart from the flow body, the mount structure disposed within, and coupled to, the compressor inlet housing, and having at least one discharge flow passage formed therein, and a plurality of spaced-apart supports coupled to the flow body and the mount structure, at least one the spaced-apart supports having a flow passage formed therein that is in fluid communication with the flow body cavity and the at least one mount structure discharge flow passage.

12. The engine of claim 11, further comprising:

an anti-ice control valve including a valve inlet and a valve outlet, the valve inlet coupled to receive the flow of compressed air discharged from the centrifugal compressor, the valve outlet in fluid communication with the flow body inlet port, the anti-ice control valve movable between a closed position, in which the valve inlet is not in fluid communication with the valve outlet and compressed air discharged from the centrifugal compressor is not supplied to the flow body inlet port, and an open position, in which the valve inlet is in fluid communication with the valve outlet and compressed air discharged from the centrifugal compressor is supplied to the flow body inlet port.

13. The engine of claim 11, further comprising:

an inlet boss extending from the flow body outer surface, the inlet boss having an inlet passage in fluid communication with the flow body inlet port.

14. The engine of claim 11, wherein:

the mount structure includes a plurality of discharge flow passages formed therein; and each of the supports includes a flow passage formed therein that is in fluid communication with the flow body cavity and one of the plurality of mount structure discharge flow passages.

15. The engine of claim 11, wherein:

the compressor inlet includes an aft annular housing, a forward annular housing spaced apart from the aft annular housing, and a plurality of axially disposed struts coupled between the forward and aft annular housing; and the supports are configured such that each support extends coaxial with, and is radially spaced-apart from, one of the struts.

16. The device of claim 15, wherein:

the flow body is configured such that at least a portion thereof is radially spaced apart from the aft annular housing.

17. The engine of claim 16, further comprising:

a seal disposed between the flow body and the aft annular housing.

18. The device of claim 15, wherein the mount structure is configured such that at least a portion thereof is radially spaced apart from the forward annular housing.

19. The device of claim 18, further comprising:

a seal disposed between the mount structure and the forward annular housing.

20. The engine of claim 11, wherein the mount structure comprises:

a main body coupled to each of the plurality of supports and including the at least one discharge flow passage; and a mount flange extending radially inwardly from the main body and including a plurality of fastener openings extending axially therethrough.

* * * * *